July 25, 1933.                G. M. BELLANCA                1,919,682
                      PROPELLING MECHANISM FOR AIRPLANES
                   Original Filed Jan. 10, 1931    2 Sheets-Sheet 1
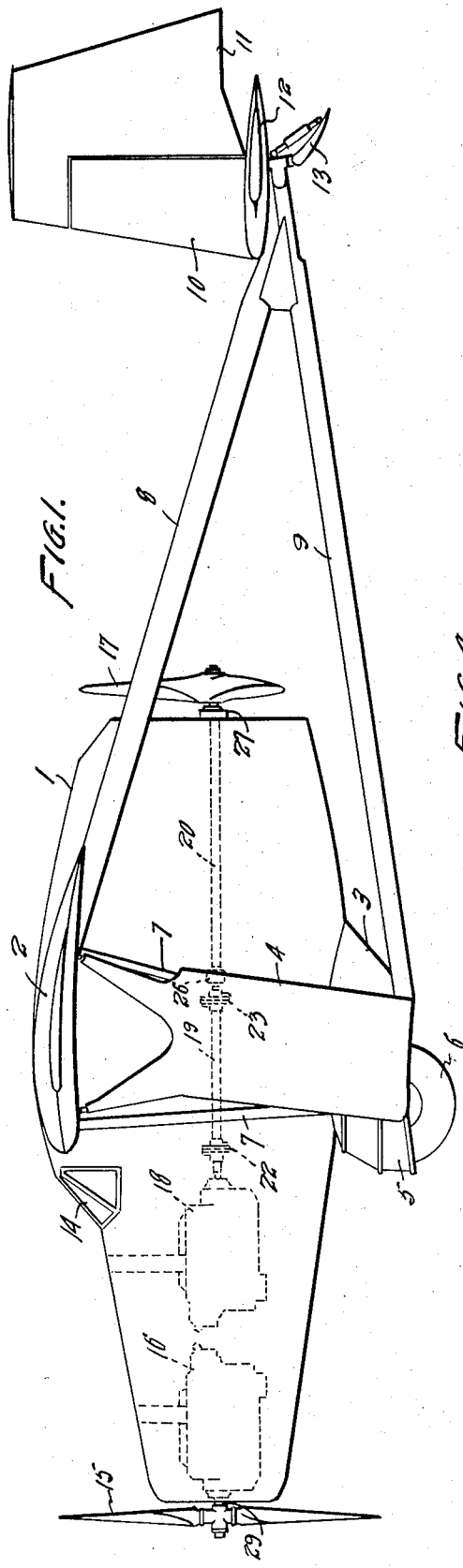
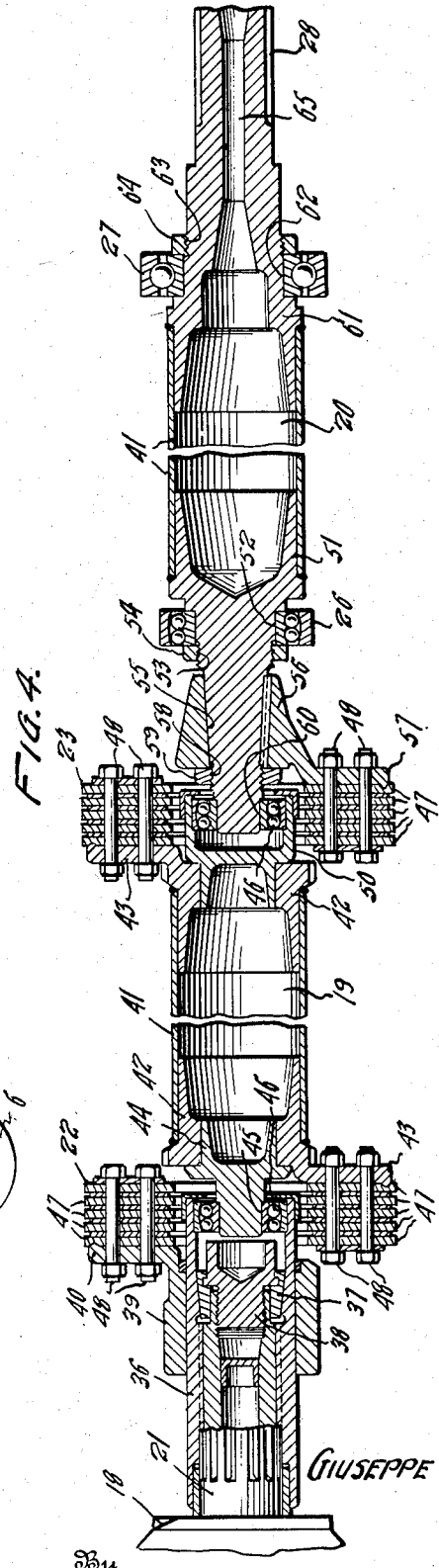
Inventor
GIUSEPPE M. BELLANCA
By
Semmes & Semmes
Attorney

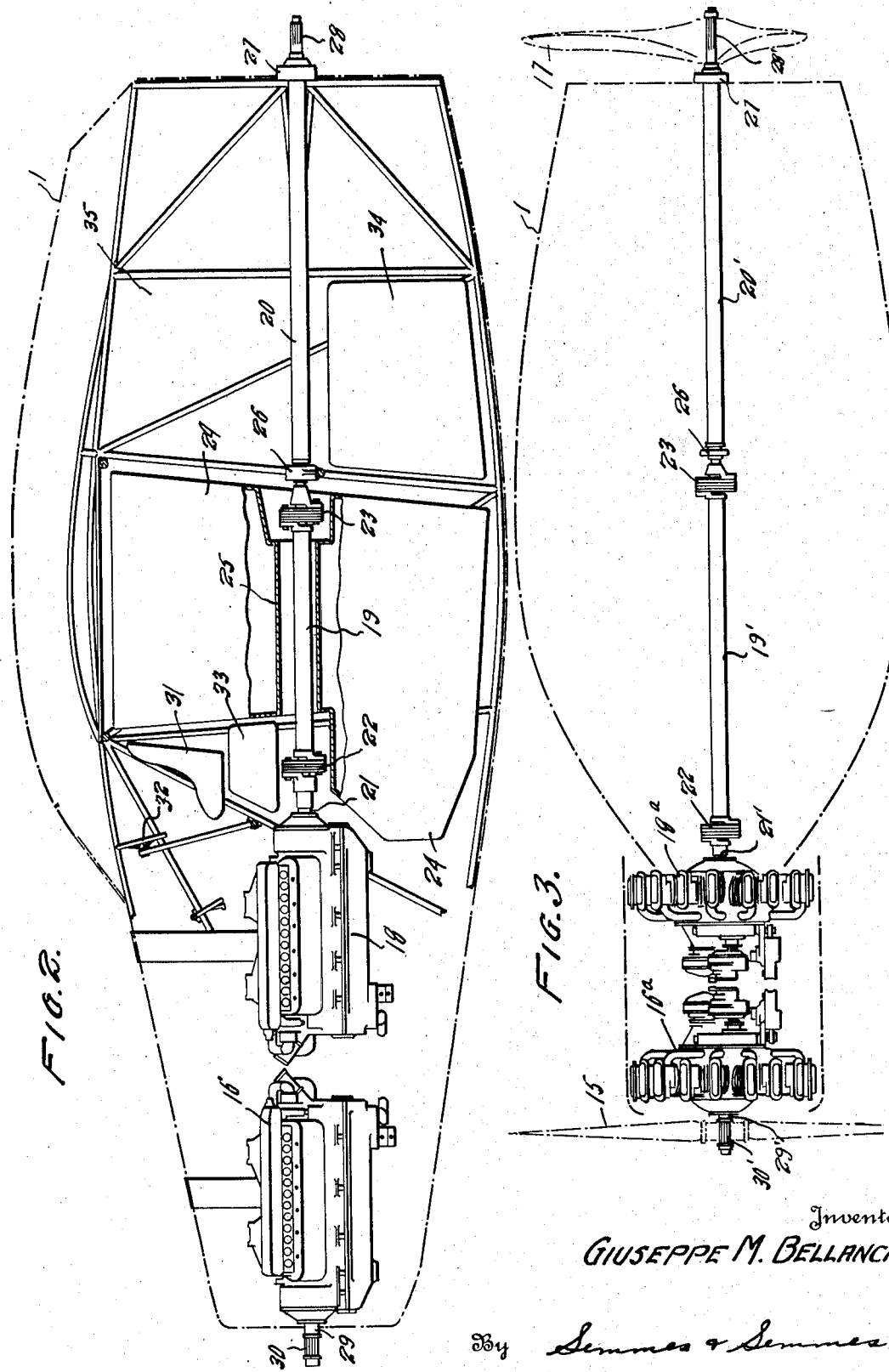

Patented July 25, 1933

1,919,682

UNITED STATES PATENT OFFICE

GIUSEPPE M. BELLANCA, OF NEW CASTLE, DELAWARE

PROPELLING MECHANISM FOR AIRPLANES

Application filed January 10, 1931, Serial No. 507,982. Renewed December 12, 1932.

This invention relates in general to airplanes and more particularly has reference to an arrangement of propellers, power plants and transmission mechanism therefor.

Heretofore it has been customary to arrange the propelling and power plant units of airplanes in a number of different ways. It is notable that except in rare instances it has been customary to mount the propeller either directly upon the engine shaft, or in some other manner in which it is positioned closely adjacent the engine. This has limited the field of airplane design in that it has always necessitated the location of the propellers at such a point on the airplane that the weight of the engine may be placed closely adjacent thereto. It has prevented the placing of propellers on parts of the airplane which could not support the weight of the engines, or upon which the weight of the engines would be undesirable for other reasons.

One reason for the trend of design toward placing the airplane engines and propellers closely adjacent each other is due to the fact that the weave or distortion of the fuselage in flight prevents the use of a long rigid length of shafting. Furthermore, such shafting as ordinarily used would be far too heavy for use in airplanes in any very great lengths. It has been impracticable to use such flexible couplings as are in ordinary use at the present time for the reason that these couplings do not maintain the ends of connected shafts in precisely concentric relation to each other. Due to the flexibility of the connecting elements the ends of the shafts are allowed to move laterally with respect to each other, and in the case of such high speed shafts as are used in airplanes, such a movement would produce an immense amount of vibration and would be apt to cause disastrous results.

Among the other reasons why shafting has not been used to any great extent in transmitting power to the propellers of airplanes, is the fact that such shafting would frequently interfere with the placing of certain desired objects within the fuselage. This has been especially true of the disposal of fuel tanks in long distance planes. It frequently happens that it is desirable to place a fuel tank within the fuselage of an airplane in such a manner that it occupies substantially the entire cross-section of the fuselage for a considerable portion of its length. Such a disposition of a fuel tank would ordinarily prevent the use of a propeller shaft running longitudinally within the fuselage.

One of the objects of this invention is to overcome the above and other disadvantages in the prior art.

Another object of this invention is to provide an arrangement whereby the engine or engines of an airplane may be placed in positions remote from the position of the propeller.

Still another object of this invention is to provide an arrangement whereby the engines of an airplane may be placed adjacent the nose of the fuselage and whereby at least one of the propellers may be positioned at the rear end of the fuselage.

Yet another object of this invention is to provide a fuel tank so constructed that a propeller shaft may extend therethrough in transmitting power from one end of the airplane fuselage to the other.

Yet another object of this invention is to provide an airplane having a fuselage and a propeller shaft extending a major portion of the length of the fuselage.

Still another object of this invention is to provide a propeller shaft unit which is formed in such a manner as to furnish the greatest strength for transmission of power with the least weight.

One other object of this invention is to provide a flexible coupling for use with airplane propeller shafts, and to combine with the said coupling a means for positively maintaining the ends of shafts coupled thereby in concentric relation to each other.

With the above and other objects in view my invention consists essentially of an airplane fuselage having engines, propellers and propeller shafts arranged therein in substantially the manner set forth in the drawings and the following specification.

In order to insure a perfect understanding of my invention and for the purpose of explaining and disclosing the same to those skilled in the art to which it pertains, I have illustrated certain embodiments thereof in the accompanying drawings in which:

Figure 1 is a diagrammatic view of an airplane illustrating broadly the arrangement of engines, propeller shaft and propellers of my invention.

Figure 2 is a view of the interior of the fuselage of the airplane shown in Figure 1 with parts broken away for the sake of illustration.

Figure 3 is an illustration of one manner of arranging my invention in connection with the use of air cooled radial engines.

Figure 4 is a detailed sectional view of my improved propeller shaft.

Referring now more specifically to the drawings and particularly to Figure 1 thereof there is shown an airplane having a fuselage 1 upon which there are mounted the sustaining wings 2 and stub wings 3. As shown in this figure the sustaining wings are formed to extend laterally from the upper portion of the fuselage whereas the stub wings extend laterally and downwardly from the lower portion of the fuselage. To the outer ends of the stub wings 3 there are attached strut members 4 which are preferably formed as airfoils to assist in the functioning of the airplane. These strut members 4 extend outwardly and upwardly to the lower surfaces of the wings 2, and assist in the support of said wings. At the junctures between the stub wings 3 and the struts 4 there are formed downwardly opening stream lined housings or fairings 5 for the purpose of receiving landing wheels or other landing members 6. From the junctures between the members 3 and 4 the struts 7 extend upwardly in a substantially vertical plane to the lower surfaces of the wings 2, and lend considerable strength and rigidity to the structure already described.

Attached to the wings 2 or otherwise as desired are members 8 which extend downwardly and rearwardly for a purpose to be presently described. There are also attached to the junctures between the members 3 and 4 rearwardly extending members 9 which join the members 8 at a certain distance to the rear of the fuselage. These members 8 and 9 support adjacent their point of juncture an empennage structure 10 consisting of the rudder 11 and the elevators 12. There is also provided a tail skid 13 of the customary construction. It will be noted that by virtue of the arrangement of the members 8 and 9 there is left an open space immediately to the rear of the fuselage within which a propeller may be arranged.

The fuselage proper is arranged with the customary pilot's window 14 adjacent its uppermost part, thus furnishing the pilot with the amount of vision required to properly operate the airplane. At the nose of the fuselage there is provided a propeller 15 of the customary design which is intended to receive its power from the engine 16. The engine 16 is positioned within the nose of the fuselage and immediately to the rear of the propeller 15. A propeller 17 is positioned immediately to the rear of the fuselage in the space which has been mentioned heretofore as being sufficient to accommodate a propeller. This propeller is intended to receive its power from the engine 18 through the medium of the shafts 19 and 20.

Referring now to Figure 2 of the drawings, it may be noted that the shaft 19 is connected to the engine shaft 21 of the engine 18 by means of a flexible coupling 22 and that the shafts 19 and 20 are connected to each other by means of a similar coupling 23. The shaft 21 is, of course, supported in the customary manner by the bearings within the engine 18. The shaft 20 is supported by a radial bearing 26 and by a combined radial and thrust bearing 27. This shaft is provided at its free end with splines 28 for the purpose of receiving the propeller 17. In the case of the engine 16, the engine shaft 29 is provided with splines 30 directly formed thereon for the purpose of receiving the propeller 15. It will thus be seen that the engine 16 carries the propeller 15, which it drives, directly upon its power shaft, whereas the engine 18 drives its propeller 17 through the intermediary of the shafts 19 and 20 and the flexible couplings 22 and 23.

In Figure 2 there is shown a fuel tank 24, such as is frequently used in long distance airplanes, which occupies substantially the entire cross-section of the fuselage for a portion of its length. As has already been pointed out, such a tank would ordinarily preclude the use of a propeller shaft extending through the major portion of the length of the fuselage. In the present instance, however, I have so formed this tank 24 that it is capable of allowing the section of shaft 19 to extend therethrough. To the accomplishment of this end I have first formed apertures of the proper size and shape in the front and rear walls of the tank 24. I have then sealed within these apertures so as to extend between them a tubular member 25 which serves to complete the fuel tank and to allow the shaft 19 to extend therethrough.

In this figure there is also shown a seat 31 for the accommodation of the pilot of the airplane and the customary controls 32 provided in a position convenient to the said pilot's seat. Beneath the pilot's seat there is arranged a tank 33 for containing the oil necessary for the power plants. There may also be positioned within the fuselage certain auxiliary fuel tanks such as shown at 34. It is noted that after disposing the various parts as above set forth there still remains within the fuselage a certain amount of space 35 which may be adapted to the carrying of freight or passengers or to the accommodation of radio or other equipment, as desired.

In Figure 3 I have illustrated diagrammatically an arrangement similar to that above described in which the power plants for furnishing the power to the respective propellers consist of the air cooled engines 16a and 18a mounted outside of and to the front of the fuselage. In this arrangement the parts cooperate in a manner similar to that in the arrangement already described. Thus the shaft 21' of the engine 18a drives the propeller 17 through the medium of the shafts 19' and 20' and the flexible couplings 22 and 23. The shaft 20' is supported by bearings 26 and 27 and is provided with a splined portion 28'. Also, the shaft 29' of the engine 16a is provided with a splined portion 30' adapted to receive the propeller 15.

In Figure 4 I have illustrated in detail my improved propeller shaft for airplanes. It will be noted that certain portions of the shafts 19 and 20 have been broken away for the purpose of conserving space, only the end portions of said shafts being illustrated.

As illustrated in Figure 4 the shaft 21 of the engine 18 is splined and adapted to receive a sleeve or tubular member 36, said member being secured to the end of said shaft by means of the locking plug 38 and the annular wedge 37. The plug 38 as shown in the drawings is threaded into the hollow end of the shaft 21 and has a shoulder bearing against the annular wedge 37 which in turn wedges the sleeve 26 tightly on to the shaft 21. Around the outer portion of the sleeve 36, is secured the collar 39 which has at one side thereof a radially extending arm 40 for a purpose to be hereinafter described.

As will be seen from the drawings the shafts 19 and 20 are formed mainly of tubular sleeves 41 which constitute the form of shaft capable of transmitting the greatest power for the least weight. However, it is apparent that such a sleeve does not lend itself readily to an attachment to flexible couplings or the like. For this purpose therefore there have been inserted into each end of the sleeve 41 of the shaft 19 certain fittings 42. These fittings are in the form of hollow members of whatever material is found suitable, and are preferably butt-welded to the ends of the sleeves 41. Each of these members 42 has at one side thereof a radially extending arm 43 which is similar in form to the arm 40 of the collar 39 above described.

Within the hollow portion of one of the members 42 there is fitted still another member 44 having an axially projecting part 45 adapted to receive the inner race of a bearing 46. The outer race of this bearing is positioned within the open end of the sleeve 36 hereinbefore described. As will be appreciated, the purpose of this bearing is to maintain the ends of the shafts 19 and 20 in exactly concentric relation at all times, and to remove the strain of maintaining the shafts in such relation from the flexible coupling members 47 now to be described.

A plurality of these flexible coupling members 47 which may take the form of fabric rings, or may be of whatever other form is desirable and expedient, are grouped together as illustrated in the drawings and secured by bolts 48 to the arms 40 and 43 at their opposite sides.

Like the shaft 19, the shaft 20 is formed of a tubular sleeve 41 having certain suitable fittings inserted into its ends. In the case of this shaft, however, the fittings to be inserted into the ends of the shaft differ somewhat from those used for the shaft 19. One end of the sleeve 41 is adapted to receive a member 51 which is fitted thereinto and butt-welded in position. This member 51 is provided with a portion 52, adapted to receive the inner race of the radial bearing 26, and with a threaded portion 53, adapted to receive the nut 54 which serves to retain this bearing race in place. The member 51 is further provided with a conical portion 55 upon which is fitted and keyed a member 56 having a radially extending arm 57 at one side thereof. This radially extending arm is similar to the arms 40 and 43 carried by the members 39 and 42 respectively, above described. A second threaded portion 58 is provided at the smaller end of the conical portion 55 for the purpose of receiving the nut 59 which is adapted to force the member 56 into place and retain it in position. At the outer extremity of the member 51 there is provided a portion 60, adapted to receive the inner race of the ball bearing 46, which is identical with that interposed between the shafts 19 and 21. The outer race of this ball bearing is carried by the member 50 which in turn fits within the hollow opening of the other member 42 of the shaft 19. It will be seen that this bearing 46 serves the same purpose and performs the same function in connection with shafts 19 and 20 as does the other bearing 46 in connection with the shafts 21 and 19. The flexible coupling between the shafts 19 and 20 is formed in the same manner as the coupling above described between shafts 21 and 19, by bolting a plurality of the members 47 at their opposite sides respectively to the arms 43 and 57 by means of the bolts 48.

At the other end of the shaft 20 there is provided a fitting 61 which engages the end of the sleeve 41 in much the same manner as the fitting 51 and is likewise butt-welded thereto. This fitting 61 is provided with a portion 62 for receiving the inner race of the combined radial and thrust bearing 27, and with a threaded portion 63 upon which is mounted a nut 64 retaining said bearing in place. Upon the outer portion of the fitting 61 there are formed splines 28 adapted to receive a propeller 17 in the customary manner. It is further noted that the fitting 61 is hollow throughout its length for the purpose of reducing the weight as much as possible.

From the foregoing, it will be observed that I have provided a strut which enables the positioning of an airplane engine adjacent one end of the fuselage and the propeller adjacent the other end. It will be further appreciated that I have provided a means whereby the engine or engines of an airplane may be positioned in the most advantageous location for disposing of their weight, while the propellers may be positioned at a point or points remote therefrom according to the desire of the designer.

It will also be appreciated that I have provided a propeller shaft for an airplane, including at least two flexible couplings for the purpose of compensating for the weaving or distortion of the airplane in flight.

I have also provided a propeller shaft for airplanes which is of the least possible weight for the maximum strength and which may extend from one extremity of the airplane to the other.

I have also provided an airplane having a plurality of engines positioned adjacent each other, at least one of said engines actuating a propeller which is positioned at a point remote thereto.

It will further be appreciated that I have provided an arrangement in which a propeller shaft is allowed to extend a major portion of the length of the fuselage without interfering with the disposition of a large fuel tank therein.

I have also provided a flexible coupling for use in airplane propeller shafts and have combined the same with a means for positively maintaining the ends of the shafts coupled thereby in a concentric relation to each other. By virtue of this means the stress and strain incident to maintaining the shafts in alignment is removed from the flexible members of the flexible coupling, and any possibility of eccentricity of the shafts is avoided. It will be appreciated that this feature is very important in the case of shafts running at as high a speed as is necessary for an airplane propeller shaft.

While I have illustrated and described one embodiment of my invention, I wish it to be clearly understood that the same is by way of illustration and example only and is not to be interpreted as in any way limiting the scope of my invention. My invention is to be limited in scope only by the prior art and by the terms of the appended claims.

I claim:

1. An airplane comprising in combination a fuselage, a fuel tank mounted within said fuselage and occupying the major part of the cross section of said fuselage for a portion of its length, said tank being formed with an opening in both its forward and rearward walls, a tubular member extending through the tank and being sealed to the walls of the tank around each of said openings, and a propeller shaft line extending a major portion of the length of the fuselage and passing through said openings and said tubular member.

2. An airplane comprising in combination a fuselage, a fuel tank mounted within said fuselage and occupying the major part of the cross section of said fuselage for a portion of its length, said tank being formed with an opening in both its forward and its rearward walls, a tubular member extending through the tank and being sealed to the walls of the tank around each of said openings, and a propeller shaft line comprising a shaft mounted in bearings in the fuselage in front of the tank, a shaft mounted in bearings in the fuselage in the rear of the tank, a shaft flexibly connected to each of said aforementioned shafts and extending through said openings and said tubular member, and means to positively maintain the respective ends of said last mentioned shaft in concentric relation to the ends of said first mentioned shafts.

3. In an airplane, a fuselage, a propeller adjacent one end of said fuselage, an engine adjacent the other end of said fuselage, a fuel tank within said fuselage, said fuel tank having an opening extending throughout its length and a propeller shaft interconnecting said engine and said propeller and passing through the opening in the fuel tank.

4. In an airplane, a fuselage, a propeller adjacent one end of said fuselage, an engine adjacent the other end of said fuselage, a fuel tank within said fuselage, said fuel tank having an opening extending throughout its length and a propeller shaft interconnecting said engine and said propeller and passing through the opening in the fuel tank, said propeller shaft having at least two flexible couplings interposed therein between the engine and the propeller to compensate for distortion of the fuselage in flight.

GIUSEPPE M. BELLANCA.